United States Patent
Kallioniemi et al.

(10) Patent No.: US 7,954,607 B2
(45) Date of Patent: Jun. 7, 2011

(54) METHOD AND ARRANGEMENT FOR MONITORING THE SAFETY OF A TRANSPORT SYSTEM

(75) Inventors: Antti Kallioniemi, Jokela (FI); Lauri Stolt, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 12/834,444

(22) Filed: Jul. 12, 2010

(65) Prior Publication Data

US 2010/0308762 A1 Dec. 9, 2010

Related U.S. Application Data

(63) Continuation of application No. PCT/FI2009/000022, filed on Feb. 4, 2009.

(30) Foreign Application Priority Data

Feb. 12, 2008 (FI) .................................... 20080098

(51) Int. Cl.
*B66B 1/34* (2006.01)
(52) U.S. Cl. ....................... 187/393; 187/287
(58) Field of Classification Search ............... 187/247, 187/277, 287, 288, 293, 296, 297, 305, 286, 187/289, 319–394, 281; 318/714–721, 799–815, 318/434; 361/51

See application file for complete search history.

(56) References Cited

U.S. PATENT DOCUMENTS

| | | | | |
|---|---|---|---|---|
| 2,149,452 A | * | 3/1939 | Lewis et al. | 187/296 |
| 3,323,606 A | * | 6/1967 | Bruns et al. | 177/147 |
| 4,982,816 A | * | 1/1991 | Doi et al. | 187/296 |
| 5,070,967 A | | 12/1991 | Katzy et al. | |
| 5,734,135 A | * | 3/1998 | Hakala et al. | 187/292 |
| 6,202,794 B1 | * | 3/2001 | Hakala et al. | 187/277 |
| 6,401,875 B1 | * | 6/2002 | Marvin et al. | 187/393 |
| 7,176,677 B2 | * | 2/2007 | Narumi et al. | 324/207.25 |
| 2002/0175651 A1 | | 11/2002 | Kaneko et al. | |
| 2005/0269163 A1 | | 12/2005 | Angst | |
| 2007/0227828 A1 | * | 10/2007 | Kinpara et al. | 187/295 |

FOREIGN PATENT DOCUMENTS

| | | |
|---|---|---|
| EP | 1254070 B1 | 3/2004 |
| JP | 11-335030 A | 12/1999 |
| JP | 2006-298539 A | 11/2006 |
| WO | WO 2005/030630 A1 | 4/2005 |

* cited by examiner

*Primary Examiner* — Jonathan Salata
(74) *Attorney, Agent, or Firm* — Birch, Stewart, Kolasch & Birch, LLP

(57) ABSTRACT

The invention relates to a method and an appliance for monitoring the safety of a transport system. The transport system includes a transport appliance and also a synchronous motor for moving the transport appliance. In the method, the motion information of the transport appliance is determined with two channels, and if the determined motion informations deviate from each other by more than the set limit value, an emergency stop is executed.

15 Claims, 2 Drawing Sheets

METHOD AND ARRANGEMENT FOR MONITORING THE SAFETY OF A TRANSPORT SYSTEM

Figure 1:
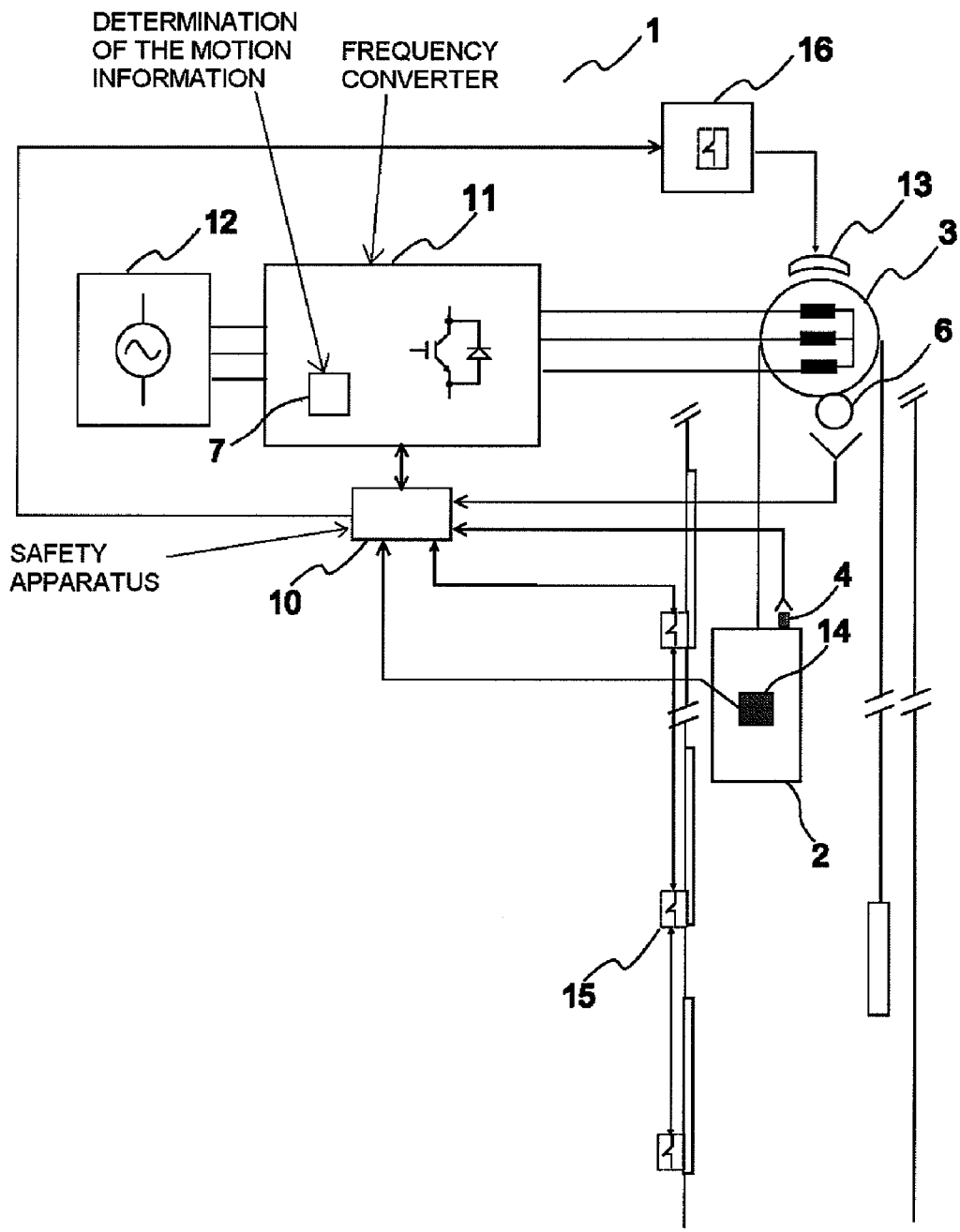

This application is a Continuation of copending PCT International Application No. PCT/FI2009/000022 filed on Feb. 4, 2009, and for which priority is claimed under 35 U.S.C. §120; and this application claims priority of Application No. 20080098 filed in Finland on Feb. 12, 2008 under 35 U.S.C. §119; the entire contents of all are hereby incorporated by reference into the present application.

FIELD OF THE INVENTION

The present invention relates to a method for monitoring the safety of a transport system, an arrangement for monitoring the safety of a transport system, and a safety apparatus of a transport system.

Monitoring of the motion of a transport appliance generally requires a two-channel measurement of motion. Conventionally at least two separate motion sensors are fitted into the transport system for this purpose.

The motion sensors are generally mechanical, wearing components, in which case impairment of their operation affects the overall reliability of the transport system.

The operation of the transport system is conventionally interrupted when a malfunction of a motion sensor is detected, in which case the service level of the transport system deteriorates.

Publication EP 1602610 A1 presents monitoring of the motion of an elevator system based both on the motion sensor of the elevator motor and on the measurements of the motion sensor of the elevator car.

The purpose of this invention is to solve the aforementioned problems as well as the problems disclosed in the description of the invention below. The invention presents monitoring of the safety of a transport system that is simpler and more reliable than prior art. As a result of the monitoring, the service level of the transport system is also better than that of prior art.

The method according to the invention for monitoring the safety of a transport appliance the arrangement according to the invention for monitoring the safety of a transport system, and the safety apparatus of a transport system according to the invention are characterized by what is disclosed in the characterization part of the independent claims. Other features of the invention are characterized by what is disclosed in the other claims. Some inventive embodiments are also discussed in the descriptive section of the present application. The inventive content of the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts.

In the arrangement according to the invention for monitoring the safety of a transport system, the transport system comprises a transport appliance, a synchronous motor for moving the transport appliance, and also a stopping appliance controlled by the transport appliance. The arrangement for monitoring the safety of a transport system in this case comprises a motion sensor of the transport appliance, a determination of the electrical parameters of the synchronous motor, a determination of the motion information of the transport appliance from the signal of the motion sensor of the transport appliance, a determination of the motion information of the transport appliance from the electrical parameters of the synchronous motor, monitoring of the determination of the motion information of the transport appliance on the basis of the motion information of the transport appliance determined from the signal of the motion sensor of the transport appliance and also on the basis of the motion information of the transport appliance determined from the electrical parameters of the synchronous motor, and also a control of a stopping appliance of the transport appliance according to the aforementioned monitoring of the determination of the motion information.

The safety apparatus of the transport system according to the invention comprises an input for the signal of the motion sensor of the transport appliance, an output for the control signal of the stopping appliance of the transport appliance, a bus for the motion information determined from the electrical parameters of the synchronous motor, monitoring of the determination of the motion information of the transport appliance on the basis of the signal of the motion sensor of the transport appliance as well as on the basis of the motion information determined from the electrical parameters of the synchronous motor, and also a control of the stopping appliance of the transport appliance according to the monitoring of the determination of the motion information.

The term transport appliance of a transport system according to the invention refers to a part of a transport system, with which the object to be transported is moved. These kinds of transport systems are, for instance, an elevator system, an escalator system, a travelator system and also a positive drive elevator system or a crane system. The invention is suited for use also in e.g. in connection with trains or, for instance, in connection with various conveyors such as conveyor belts of power plants, factories or warehouses. However what all these applicable transport systems have in common is that the transport appliance in them, such as the elevator car of an elevator system, is arranged to be moved with a synchronous motor.

In one embodiment of the invention the motion information of the transport appliance is determined from source voltage of the synchronous motor and/or from the variation of the inductance of the synchronous motor. In this manner a reliable determination of motion is achieved, because the aforementioned source voltage of the synchronous motor is produced directly from the motion of the rotor excitation. In this case the motion of the rotor can also be determined in connection with the dropping of the rotor from synchronism. The motion of the rotor can often be determined reliably also from the variation in the inductance of the synchronous motor, because with many types of electrical machines the inductance of the magnetic circuit varies owing to the geometry of the rotor. The variation in inductance is considerable e.g. with the types of permanent-magnet motors in which the permanent magnets are embedded in the rotor such that the length of the air gap between the rotor and the stator varies. The rotor excitation can also cause the magnetic circuit to become locally saturated. In this case the saturation of the magnetic circuit can be detected as a variation in the inductance.

In one embodiment of the invention the determined motion information of the transport appliance is compared to the reference of the motion of the transport appliance, and if the motion information deviates from the reference of motion by more than the set limit value, an emergency stop is executed. In one embodiment of the invention the aforementioned reference of the motion of the transport appliance is formed from reference values of motion that are sequential to each other.

In one embodiment of the invention, when executing an emergency stop, a stopping appliance of the transport appliance, such as the machinery brake of the synchronous motor, or another braking apparatus that brakes the transport appliance, such as the guide rail brake or the wedge brake, i.e. the safety gear, of the elevator system is if necessary controlled. The control can occur in this case e.g. by preventing the power supply to the opener of the brake, such as to the magnetization coil of the machinery brake.

In one embodiment of the invention the power supply from the power source to the motor is also prevented in connection with control of the brake, by opening at least one controllable switch fitted to the power supply circuit of the motor.

In one embodiment of the invention re-starting of the operation of the transport system is prevented after an emergency stop.

The aforementioned motion sensor of the transport appliance can be e.g. an acceleration sensor fixed to the transport appliance, a sensor disposed on the rope pulley of the overspeed governor of the elevator system, such as a tachometer or an encoder, a sensor connected between the elevator car and the guide rail, or another sensor that directly measures the motion of the transport appliance. One such possible motion sensor is e.g. Schmersal AG's USP 30 or USP 100 sensor.

In one embodiment of the invention a sensor that measures the magnetic field, e.g. a Hall sensor, a measuring transformer or a magneto-resistive sensor, is fitted in connection with the magnetic circuit of the synchronous motor and the motion of the magnetic field produced by the rotor excitation of the synchronous motor is measured with the aforementioned sensor. In this case the motion of the rotor can be further determined on the basis of the motion of the measured magnetic field; the motion of the transport appliance, on the other hand, can further be determined as proportional to the motion of the rotor of the synchronous motor.

The term monitoring of the determination of the motion information refers to the monitoring by means of which the operating condition of the determination of the motion information, e.g. the operating condition of the motion sensors, can be inferred.

The aforementioned motion sensor of the synchronous motor can be e.g. an encoder fitted in connection with the synchronous motor, an absolute encoder, a resolver or a tachometer.

The term electrical parameters of the synchronous motor refers to e.g. the current, supply voltage, output power, inductance, winding resistance or source voltage of the synchronous motor.

The synchronous motor according to the invention can be, for instance, a synchronous motor provided with a rotor winding, a permanent magnet motor, or a reluctance motor.

The synchronous motor according to the invention can be a rotating motor or a linear motor.

The term motion/motion information of the transport appliance refers to e.g. the place, speed, acceleration or jerk of the mechanics moved with the synchronous motor in the transport system.

The term restricted motion of the transport appliance refers to e.g. a restricted movement range, speed, acceleration, jerk or other motion information derived from these.

One safety apparatus according to the invention is integrated in connection with some other control apparatus of the transport system.

The aforementioned bus of the safety apparatus according to the invention for the motion information determined from the electrical parameters of the synchronous motor can be e.g. a processor bus or a serial bus.

The transmission link of the signals of the motion sensors can be either a wireline or wireless parallel or serial interface bus. If the transmission link is wireless, the signal can be e.g. an electromagnetic, optical or acoustic signal.

In the method according to the invention for monitoring the safety of a transport system, the transport system comprises a transport appliance and also a synchronous motor for moving the transport appliance. In the method the motion information of the transport appliance is determined from the signal of the motion sensor of the transport appliance; the motion information of the transport appliance is determined from the electrical parameters of the synchronous motor; and the motion information of the transport appliance determined from the signal of the motion sensor of the transport appliance is compared with the motion information of the transport appliance determined from the electrical parameters of the synchronous motor, and if the motion information of the transport appliance determined from the signal of the motion sensor of the transport appliance deviates from the motion information of the transport appliance determined from the electrical parameters of the synchronous motor by more than the set limit value, an emergency stop is executed. In this case the motion information of the transport appliance can be determined with two channels but however using only one motion sensor. This results from the fact that the motion information determined from the electrical parameters of the synchronous motor correspond to the mechanical motion of the rotor, because the motion of the magnetic field of the synchronous motor and the mechanical motion of the rotor are proportional to each other. For example the source voltage of the synchronous motor is produced directly from the motion of the rotor excitation. This simplifies the two-channel measurement of motion, in which case the reliability of the measurement improves and the costs decrease. In this case by comparing two motion informations of the transport appliance that are determined in different ways with each other, the correctness of the motion information can be ensured. Furthermore when it is detected that the aforementioned motion informations deviate from each other, an emergency stop can be executed if necessary, in which case the safety of the transport system is ensured. In this way the dangerous situation otherwise following e.g. a breakage of the ropes of an elevator car can be avoided.

In one embodiment of the invention the motion information of the transport appliance is determined from the signal of the motion sensor of the synchronous motor; the motion information of the transport appliance determined from the signal of the motion sensor of the synchronous motor is compared with the motion information of the transport appliance determined from the signal of the motion sensor of the transport appliance, and if the motion information of the transport appliance determined from the signal of the motion sensor of the synchronous motor deviates from the motion information of the transport appliance determined from the signal of the motion sensor of the transport appliance by more than the set limit value, the aforementioned motion informations of the transport appliance determined from the signal of the motion sensor of the synchronous motor and also from the signal of the motion sensor of the transport appliance are compared to the motion information of the transport appliance determined from the electrical parameters of the synchronous motor, and on the basis of the comparison the operating condition of the aforementioned motion sensors is determined. In this case when the monitoring of the determination of the motion information has detected that the motion informations of the transport appliance determined from the signal of at least two different motion sensors deviate from each other by more than the set limit value, the operating condition of the aforementioned motion sensors as well as of the determinations of motion information can be further determined according to the invention. By comparing the determined motion informations of the transport appliance it is possible to infer whether e.g. only one of the aforementioned motion sensors or determinations of motion information is defective.

If the motion information of the transport appliance determined from the signal of the motion sensor of the synchronous motor deviates from the motion information of the transport appliance determined from the electrical parameters of the synchronous motor by more than the set limit value, but the deviation of the motion information of the transport appliance determined from the signal of the motion sensor of the transport appliance from the motion information of the transport appliance determined from the signal of the motion sensor of the synchronous motor is within the permitted range, the operation of the transport system can still be continued, in which case the service level of the transport system improves. This is advantageous when compared to those prior-art transport systems in which the operation is interrupted when a motion sensor becomes defective. In this case it is also possible if necessary to continue operation of the transport system with restricted motion, in which case the safety of the transport system is ensured. If, on the other hand, the motion information of the transport appliance determined from the signal of the motion sensor of the transport appliance deviates from the motion information of the transport appliance determined from the electrical parameters of the synchronous motor by more than the set limit value, the operation of the transport system can be interrupted by executing an emergency stop.

PRESENTATION OF DRAWINGS

Figure 2:
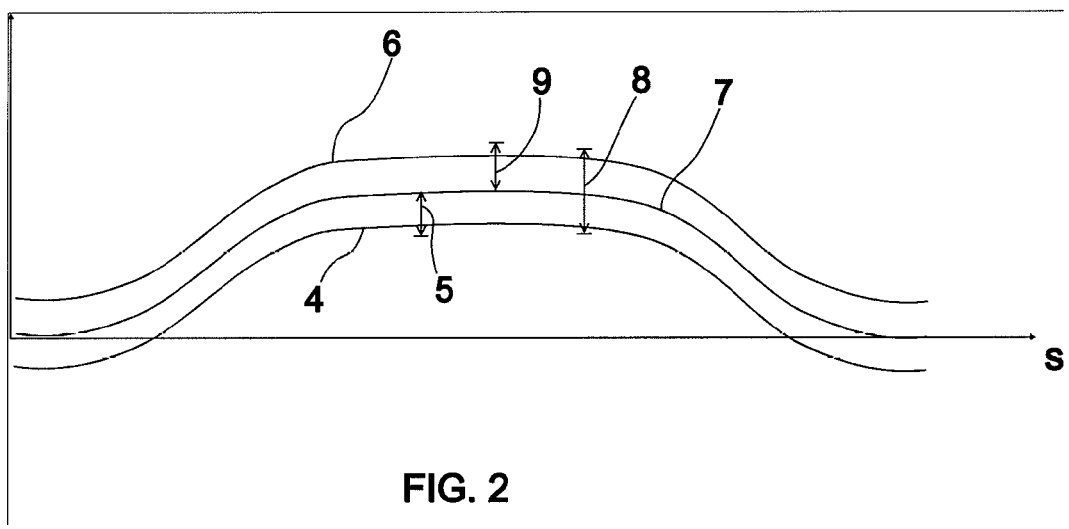

In the following, the invention will be described in more detail by the aid of a few examples of its embodiments with reference to the attached drawings, wherein FIG. 1 presents an elevator system according to the invention FIG. 2 presents the motion informations of a transport appliance that are determined in different ways

EMBODIMENTS

FIG. 1 presents an elevator system 1 according to the invention. The elevator car 2 and the counterweight are moved in the elevator hoistway via ropes connected to the traction sheave of the synchronous motor 3. The power supply of the synchronous motor 3 occurs from the power source 12 through a frequency converter 11. The power supply occurs by controlling the solid state switches of the frequency converter 11. An arrangement for monitoring the safety of the elevator system is fitted into the elevator system. The arrangement comprises a determination of the electrical parameters of the synchronous motor 3, as well as a determination 7 of the motion information of the transport system from the electrical parameters of the synchronous motor. The aforementioned determination 7 of the motion information is integrated into the frequency converter 2. The electrical parameters of the synchronous motor, such as the current and supply voltage, are measured with the frequency converter, and utilizing the aforementioned information as well as e.g. information about the winding resistance and inductance of the synchronous motor, the motion information 7 of the transport system is determined with some prior-art method, e.g. by determining the source voltage of the synchronous motor. In this case the information about the motion of the magnetic field of the synchronous motor 3 is used in the determination of the motion information 7 of the transport system, because the source voltage vector and the excitation axis of the rotor of the synchronous motor 3 are situated in the synchronous motor 3 essentially at a right angle with respect to each other. A safety apparatus 10 is also fitted to the elevator system, which here is integrated as a part of the control of the frequency converter 11.

In the first embodiment of the invention, the motion of the elevator car 2 is determined from the signal of the acceleration sensor 4 fixed to the elevator car, which signal is sent to a safety apparatus 10, and the motion is compared to the motion information of the elevator car determined from the electrical parameters of the synchronous motor 3. Before the comparison of motion informations, the motion information determined from the electrical parameters of the synchronous motor 3 and also the motion information of the elevator car determined from the signal of the acceleration sensor 4 must be converted and scaled to correspond to each other. The motion informations thus determined are compared, and if the motion information of the elevator car determined from the signal of the acceleration sensor 4 of the elevator car deviates from the motion information 7 of the elevator car determined from the electrical parameters of the synchronous motor 3 by more than the set limit value 5, an emergency stop is executed by controlling the machinery brake 13 of the synchronous motor and if necessary also the wedge brake 14 of the elevator car. In addition the power supply to the synchronous motor 3 is prevented by controlling at least the set solid state switches of the frequency converter to the non-conducting state.

In the second embodiment of the invention, in addition to the aforementioned determinations of the motion information of the elevator car, also a determination of the motion information of the elevator car is performed from the signal of the motion sensor 6 of the synchronous motor is performed. The motion sensor 6 of the synchronous motor is an encoder connected with frictive traction to the traction sheave of the synchronous motor 3. In this embodiment of the invention the converted and scaled motion information of the elevator car determined from the motion sensor 6 of the synchronous motor is compared to the motion information of the elevator car determined as described above from the signal of the acceleration sensor 4 of the elevator car. If the aforementioned motion informations of the elevator car differ from each other by more than the set limit value 8, the aforementioned informations of the elevator car determined from the signal of the motion sensor 6 of the synchronous motor and from the signal of the acceleration sensor 4 of the elevator car are compared to the motion information 7 of the elevator car determined from the electrical parameters of the synchronous motor, and on the basis of the comparison the operating condition of the aforementioned motion sensors 4, 6 is determined. In this case if the motion information of the elevator car determined from the signal of the motion sensor 6 of the synchronous motor deviates from the motion information 7 of the elevator car determined from the electrical parameters of the synchronous motor by more than the set limit value 9, it is inferred that the motion sensor of the synchronous motor and/or the determination of the motion information of the motion sensor 6 has failed. If, however, the deviation of the motion information of the elevator car determined from the signal of the acceleration sensor 4 of the elevator car from the motion information 7 of the elevator car determined from the electrical parameters of the synchronous motor is within the permitted range of the set limit value 5, the operation of the elevator system is continued with restricted motion, i.e. with restricted speed and acceleration/deceleration of the elevator car. On the other hand, if the aforementioned motion information of the elevator car determined from the signal of the acceleration sensor 4 of the elevator car deviates from the motion information of the elevator car determined from the electrical parameters of the synchronous motor by more than the set limit value 5, an emergency stop is executed.

FIG. 2 presents the motion informations of a transport appliance that are determined in different ways during acceleration, even speed and deceleration of the transport appliance. The motion information of the transport appliance determined from the signal of the motion sensor 6 of the synchronous motor deviates from the motion information 7 determined from the electrical parameters of the synchronous motor by less than the limit value 9. The motion information of the transport appliance determined from the signal of the motion sensor 4 of the transport appliance deviates from the motion information 7 determined from the electrical parameters of the synchronous motor by less than the limit value 5. The motion information of the transport appliance determined from the signal of the motion sensor 6 of the synchronous motor deviates from the motion information of the transport appliance determined from the signal of the motion sensor 4 of the transport appliance by less than the limit value 8. The limit values 5, 8, 9 can be divergent from each other, but in one embodiment of the invention the limit values 5 and 9 are of the same magnitude and the limit value 8 is double compared to these.

The invention is described above by the aid of a few examples of its embodiment. It is obvious to the person skilled in the art that the invention is not limited to the embodiments described above, but that many other applications are possible within the scope of the inventive concept defined by the claims presented below.

The invention claimed is:

1. Method for monitoring the safety of a transport system, which transport system comprises a transport appliance as well as a synchronous motor for moving the transport appliance and in which method:
   the motion information of the transport appliance is determined from the signal of the motion sensor of the transport appliance wherein
   the motion information of the transport appliance is determined from the electrical parameters of the synchronous motor
   the motion information of the transport appliance determined from the signal of the motion sensor of the transport appliance is compared with the motion information of the transport appliance determined from the electrical parameters of the synchronous motor, and
   if the motion information of the transport appliance determined from the signal of the motion sensor of the transport appliance deviates from the motion information of the transport appliance determined from the electrical parameters of the synchronous motor by more than the set limit value, an emergency stop is executed.

2. Method according to claim 1, wherein
   the motion information of the transport appliance is determined from the source voltage of the synchronous motor and/or from the variation in the inductance of the synchronous motor.

3. Method according to claim 1, wherein
   the motion information of the transport appliance is determined from the signal of the motion sensor of the synchronous motor
   the motion information of the transport appliance determined from the signal of the motion sensor of the synchronous motor is compared with the motion information of the transport appliance determined from the signal of the motion sensor of the transport appliance, and if the motion information of the transport appliance determined from the signal of the motion sensor of the synchronous motor deviates from the motion information of the transport appliance determined from the signal of the motion sensor of the transport appliance by more than the set limit value,
   the aforementioned motion informations of the transport appliance determined from the signal of the motion sensor of the synchronous motor and from the signal of the motion sensor of the transport appliance are compared to the motion information of the transport appliance determined from the electrical parameters of the synchronous motor, and
   on the basis of the comparison the operating condition of the aforementioned motion sensors is determined.

4. Method according to claim 3, wherein
   if the motion information of the transport appliance determined from the signal of the motion sensor of the synchronous motor deviates from the motion information of the transport appliance determined from the electrical parameters of the synchronous motor by more than the set limit value, the operation of the transport system is continued
   if the motion information of the transport appliance determined from the signal of the motion sensor of the transport appliance deviates from the motion information of the transport appliance determined from the electrical parameters of the synchronous motor by more than the set limit value (5), an emergency stop is executed.

5. Method according to claim 3, wherein
   if the motion information of the transport appliance determined from the signal of the motion sensor of the synchronous motor deviates from the motion information of the transport appliance determined from the electrical parameters of the synchronous motor by more than the set limit value, the operation of the transport system is continued with restricted motion.

6. Arrangement for monitoring the safety of a transport system, which transport system comprises:
   a transport appliance,
   a synchronous motor for moving the transport appliance, and
   a stopping appliance controlled by the transport appliance and which arrangement for monitoring the safety of a transport system comprises:
   a motion sensor of the transport appliance,
   wherein the arrangement for monitoring the safety of a transport system comprises:
   a determination of the electrical parameters of the synchronous motor
   a determination of the motion information of the transport appliance from the signal of the motion sensor of the transport appliance
   a determination of the motion information of the transport appliance from the electrical parameters of the synchronous motor
   monitoring of the determination of the motion information of the transport appliance on the basis of the motion information of the transport appliance determined from the signal of the motion sensor of the transport appliance and also on the basis of the motion information of the transport appliance determined from the electrical parameters of the synchronous motor a control of a stopping appliance of the transport appliance according to the aforementioned monitoring of the determination of the motion information.

7. Arrangement according to claim 6, wherein the arrangement comprises:
   a determination of the source voltage of the synchronous motor and/or of the variation in the inductance of the synchronous motor.

8. Arrangement according to claim 6, wherein the arrangement comprises:
   a motion sensor of the synchronous motor
   a determination of the motion information of the transport appliance from the signal of the motion sensor of the synchronous motor
   monitoring of the determination of the motion information of the transport appliance on the basis of the motion information of the transport appliance determined from the signal of the motion sensor of the synchronous motor as well as on the basis of the motion information of the transport appliance determined from the signal of the motion sensor of the transport appliance
   determination of the operating condition of the motion sensors on the basis of motion information of the transport appliance determined from the signal of the motion sensor of the synchronous motor, on the basis of the motion information of the transport appliance determined from the signal of the motion sensor of the transport appliance, and also on the basis of the motion information of the transport appliance determined from the electrical parameters of the synchronous motor.

9. A safety apparatus of the transport system, comprising:
   an input for the signal of the motion sensor of the transport appliance
   an output for the control signal of a stopping appliance of the transport appliance
   wherein the safety apparatus comprises:
      a bus for the motion information determined from the electrical parameters of the synchronous motor
      monitoring of the determination of the motion information of a transport appliance on the basis of the signal of the motion sensor of the transport appliance as well as on the basis of the motion information determined from the electrical parameters of the synchronous motor
      a control of a stopping appliance of the transport appliance according to the monitoring of the determination of the motion information.

10. Safety apparatus according to claim 9, wherein the safety apparatus comprises:
    a bus for the motion information determined from the source voltage of the synchronous motor and/or from the variation in the inductance of the synchronous motor.

11. Safety apparatus according to claim 9, wherein the safety apparatus comprises:
    an input for the signal of the motion sensor of the synchronous motor
    monitoring of the determination of the motion information of a transport appliance on the basis of the signal of the motion sensor of the transport appliance as well as on the basis of the signal of the motion sensor of the synchronous motor
    determination of the operating condition of the motion sensors on the basis of the signal of the motion sensor of the synchronous motor, on the basis of the signal of the motion sensor of the transport appliance, and also on the basis of the motion information determined from the electrical parameters of the synchronous motor
    a bus for the signal indicating the operating condition of the motion sensors.

12. Method according to claim 2, wherein
    the motion information of the transport appliance is determined from the signal of the motion sensor of the synchronous motor
    the motion information of the transport appliance determined from the signal of the motion sensor of the synchronous motor is compared with the motion information of the transport appliance determined from the signal of the motion sensor of the transport appliance, and if the motion information of the transport appliance determined from the signal of the motion sensor of the synchronous motor deviates from the motion information of the transport appliance determined from the signal of the motion sensor of the transport appliance by more than the set limit value,
    the aforementioned motion informations of the transport appliance determined from the signal of the motion sensor of the synchronous motor and from the signal of the motion sensor of the transport appliance are compared to the motion information of the transport appliance determined from the electrical parameters of the synchronous motor, and
    on the basis of the comparison the operating condition of the aforementioned motion sensors is determined.

13. Method according to claim 4, wherein
    if the motion information of the transport appliance determined from the signal of the motion sensor of the synchronous motor deviates from the motion information of the transport appliance determined from the electrical parameters of the synchronous motor by more than the set limit value, the operation of the transport system is continued with restricted motion.

14. Arrangement according to claim 7, wherein the arrangement comprises:
    a motion sensor of the synchronous motor
    a determination of the motion information of the transport appliance from the signal of the motion sensor of the synchronous motor
    monitoring of the determination of the motion information of the transport appliance on the basis of the motion information of the transport appliance determined from the signal of the motion sensor of the synchronous motor as well as on the basis of the motion information of the transport appliance determined from the signal of the motion sensor of the transport appliance
    determination of the operating condition of the motion sensors on the basis of motion information of the transport appliance determined from the signal of the motion sensor of the synchronous motor, on the basis of the motion information of the transport appliance determined from the signal of the motion sensor of the transport appliance, and also on the basis of the motion information of the transport appliance determined from the electrical parameters of the synchronous motor.

15. Safety apparatus according to claim 10, wherein the safety apparatus comprises:
    an input for the signal of the motion sensor of the synchronous motor
    monitoring of the determination of the motion information of a transport appliance on the basis of the signal of the motion sensor of the transport appliance as well as on the basis of the signal of the motion sensor of the synchronous motor determination of the operating condition of the motion sensors on the basis of the signal of the motion sensor of the synchronous motor, on the basis of the signal of the motion sensor of the transport appliance, and also on the basis of the motion information determined from the electrical parameters of the synchronous motor a bus for the signal indicating the operating condition of the motion sensors.

* * * * *